(12) United States Patent
Filsinger et al.

(10) Patent No.: US 7,597,953 B2
(45) Date of Patent: Oct. 6, 2009

(54) COMPOSITE FIBER COMPONENT PRODUCED BY BRAIDING

(75) Inventors: Juergen Filsinger, Feldkirchen-Westerham (DE); Tamas Havar, Tuntenhausen (DE); Franz Maidl, Wallerfing (DE); Marinus Schouten, Holzkirchen (DE)

(73) Assignee: EADS Deutschland GmbH, Ottobrunn (DE)

( * ) Notice: Subject to any disclaimer, the term of this patent is extended or adjusted under 35 U.S.C. 154(b) by 366 days.

(21) Appl. No.: 11/637,131

(22) Filed: Dec. 12, 2006

(65) Prior Publication Data

US 2007/0152105 A1 Jul. 5, 2007

(30) Foreign Application Priority Data

Dec. 13, 2005 (DE) .................. 10 2005 059 933

(51) Int. Cl.
*D04H 1/00* (2006.01)
(52) U.S. Cl. .................. 428/292.1; 428/316.6; 428/71; 244/102 A
(58) Field of Classification Search .................. 428/71, 428/316.6, 292.1, 296.7; 52/309.1, 309.4; 442/204; 244/102 A
See application file for complete search history.

(56) References Cited

U.S. PATENT DOCUMENTS

| | | | |
|---|---|---|---|
| 4,183,261 A | 1/1980 | Eiselbrecher et al. | |
| 4,403,525 A | 9/1983 | Bongers | |
| 4,411,114 A * | 10/1983 | Wurtinger et al. | .......... 52/309.1 |
| 4,731,962 A * | 3/1988 | Kittner et al. | ................. 52/81.2 |
| 5,033,514 A | 7/1991 | Just et al. | |
| 5,834,082 A * | 11/1998 | Day | ............................ 428/56 |
| 5,924,649 A | 7/1999 | Piening et al. | |
| 7,393,577 B2 * | 7/2008 | Day et al. | .................... 428/121 |
| 2001/0031350 A1 * | 10/2001 | Day et al. | ................ 428/317.9 |
| 2007/0007386 A1 * | 1/2007 | Coupe et al. | ............ 244/102 A |
| 2007/0145638 A9 * | 6/2007 | Mead | ..................... 264/272.15 |
| 2007/0193158 A1 * | 8/2007 | Miller et al. | ................ 52/309.9 |
| 2008/0008883 A1 * | 1/2008 | Miller et al. | ................. 428/408 |

FOREIGN PATENT DOCUMENTS

| | | |
|---|---|---|
| DE | 26 57 832 B2 | 6/1978 |
| DE | 33 17 046 A1 | 11/1984 |
| DE | 195 29 706 C2 | 2/1997 |
| DE | 196 28 388 A1 | 1/1998 |
| DE | 103 25 190 A1 | 12/2004 |
| DE | 103 26 422 A1 | 1/2005 |
| DE | 10 2004 017 311 A1 | 11/2005 |
| EP | 0 031 413 A1 | 7/1981 |
| EP | 0 398 841 A1 | 11/1990 |
| EP | 1 736 674 A1 | 12/2006 |
| FR | 2 543 054 A1 | 9/1984 |
| FR | 2 636 386 A | 3/1990 |
| GB | 2 082 716 A | 3/1982 |
| WO | WO 2005/098117 A1 | 10/2005 |

* cited by examiner

OTHER PUBLICATIONS

European Search Report dated Feb. 2, 2007 with English translation (six (6) pages).

*Primary Examiner*—N. Edwards
(74) *Attorney, Agent, or Firm*—Crowell & Moring LLP

(57) ABSTRACT

A fiber composite component is at least partially produced by braiding. It comprises a core element which has at least one concavely constructed face that is adjoined by a passage opening. Respective opposite transverse or longitudinal sides of the core element and the side of the passage opening not bounded by the core element are enclosed by a braided fiber composite loop element.

15 Claims, 6 Drawing Sheets

COMPOSITE FIBER COMPONENT PRODUCED BY BRAIDING

BACKGROUND AND SUMMARY OF THE INVENTION

This application claims the priority of German patent document 10 2005 059 933.8-16, filed Dec. 13, 2005, the disclosure of which is expressly incorporated by reference herein.

The present invention is directed to a fiber composite component that is at least partially produced by braiding, particularly a compression-tension strut, and to a method of producing such fiber composite components. The invention also includes an aircraft having such a compression-tension strut or fiber composite component.

Fiber composite components are used in aerospace engineering and in automotive engineering, to save weight. For this purpose, construction types consisting of CFRPs (carbon fiber reinforced plastic) have been developed to replace previous metallic components (joining elements, transverse links, etc.) with fiber composite components. For example, numerous commercial aircraft currently use metallic rear links for the bearing of landing flaps; however, such metallic links should also be replaced by CFC structures to save weight.

Such a CFC concept may be based, for example, on the use of correspondingly tailored and deposited non-crimp fabrics. Such laminates can be provided, as required, with bores for receiving bearings or bolts.

European Patent Document EP 0 398 841 A1 discloses an accelerating lever which is constructed of several stacked layers in the form of prepreg (pre-impregnated) materials or semi-finished products. The layers have different fiber orientations and essentially extend parallel with respect to a plane of motion.

Furthermore, German Patent Document DE 196 28 388 A1 discloses a compression-tension strut, which is formed by depositing reinforcing fibers (such as glass fibers) corresponding to a defined laying pattern, and fixing by means of embroidering on a nonwoven material (e.g., fleece), with additional Z-axis reinforcements being provided. A disadvantage of such components produced by means of TFP (tailored fiber placement), however, is that only a small component thickness can be obtained, because the embroidering base has negative effects on the mechanical characteristics of the component, particularly due to lateral contractions during tension or compression loads.

In addition, such compression-tension struts may be produced with corresponding eyes, loops, lugs or passage openings, by means of a winding process, for example, for bearing bolts. However, in this case only a single component can be produced, and winding is a high-expenditure process. In addition, when winding at non-zero angles, an inaccurate deposit of the winding layers (overlaps or gaps) may occur which, in turn, has a negative influence on the mechanical characteristics of the component.

In the case of such fiber composite components, an optimal design with respect to the loads to be absorbed (particularly the tensile and compressive forces) generally is problematic.

It is therefore an object of the present invention to create a fiber composite component with optimized load absorption, to replace corresponding metallic components used so far.

Another object of the invention is to provide a method by which such fiber composite components can be produced effectively and therefore cost-effectively.

These and other objects and advantages are achieved by the fiber composite component according to the invention, which consists of a semi-finished fiber composite product, comprising a core element with at least one concavely constructed face that is adjoined by a passage opening. The respectively opposite lateral or longitudinal sides of the core element, as well as the side of the passage opening not bounded by the core element, are enclosed in a loop-type manner by a braided fiber composite element. Finally, for forming the finished fiber composite component, the semi-finished fiber composite product is infiltrated in a known manner by a resin system and hardened.

As used herein, the term "concave" is generally understood to mean a recessed feature; that is, the concavely constructed face may, for example, be curved toward the inside. However, the shape of the face need not necessarily be curved; rather, it may, for example, also have an angular shape. The shape of the passage opening is expediently adapted to the shape of the respective face.

Such a construction provides a fiber composite component with reduced weight in comparison to corresponding metallic components, which is also optimized for absorbing loads, such that the compression forces are absorbed by the core element and the tensile forces are absorbed by the braided fiber composite element arranged in the manner of a loop. By using the braiding technique, particularly the circular braiding technique (one example of which is disclosed in the unpublished German Patent Application DE 10 2004 017 311, whose content is to be part of this specification), the fiber composite component can be produced without any major loss of mechanical characteristics.

The at least one concavely constructed face preferably has a defined radius of curvature which is adjoined by an essentially circularly constructed passage opening preferably in a continuous manner (that is, without gaps or slots), and the braided fiber composite element will then surround the core element and the axis of curvature of the concavity, in a loop-shaped fashion.

According to a particularly preferred embodiment, the at least one concavely constructed face of the core element is adjoined by an interior element for forming the corresponding passage opening. The shape (for example, the radius of curvature) of the interior element is adapted to the shape (or the curvature) of the at least one concavely constructed face, and the core element and the outer circumferential surface of the interior element are enclosed in a loop-type fashion by the braided fiber composite element. The shape-adapted embodiment of the concavely constructed face and the corresponding interior element ensures a continuous flush transition, without gaps, slots, air pockets or cavities. The latter would lead to unwanted and disadvantageous accumulations of resin when impregnating the semi-finished fiber composite product. In addition, the use of such an interior ring permits a better introduction of forces into the core element. Furthermore, the interior ring can be machined in a simple manner, for example, by milling a fitted bore for a bearing to be accommodated.

The interior element advantageously consists of a fiber composite material which is laid or arranged, for example, in the form of prepreg layers or dry semi-finished products, around a corresponding holding element, as described in greater detail hereinafter. However, the interior element may also be produced by means of a winding process. Particularly preferably, a braided fiber composite tube section consisting of carbon, glass and/or aramid fibers is used, which can also be produced by means of the above-mentioned circular braiding technique.

The core element designed for the absorption of compression forces preferably has the shape of a rectangular parallelepiped and has corresponding longitudinal and transverse sides. In the case of concave curved faces, the axis of curvature of the concavity preferably extends perpendicular to the longitudinal sides. The axis of curvature of the concavity may also have a different orientation (for example, perpendicular to the transverse sides of the core element). Naturally, cubic-shaped, cylindrical, conical, pyramidal or core elements of another geometrical shape can also be used. The respective faces may have a recessed form either on one side or on both sides. The two faces may naturally also be differently formed.

Since the compression forces to be absorbed by the core element are low in comparison to the tensile forces to be absorbed, the core element may have a sandwich-type structure in order to save weight. The core element advantageously consists of a foam core which is surrounded in a braided manner with the formation of individual braided layers. The foam core may consist of PU foam or other conventional foamed materials.

The braided layers advantageously enclose the cross-section of the foam core in a concentric or onion-type manner. This is achieved in that the braiding takes place around the foam core in its longitudinal direction, so that the transverse and longitudinal sides are covered by braided layers.

Particularly preferably, the braiding around the foam core takes place unidirectionally at braiding angles of ±45°. This can take place, for example, by means of the initially mentioned circular braiding technique, by which, during the braiding of a first layer, carbon, glass and/or aramid fibers are interlaced as reinforcing threads at an angle of +45°, and Grilon® and/or glass fibers are interlaced as supporting thread at an angle of −45°. The orientation of the braiding will then change when the next layer is braided; that is, the supporting threads have an orientation of +45° and the reinforcing threads have an orientation of −45°. Other braiding angles may of course also be used.

Fiber composite fabrics covering at least the longitudinal sides of the core element may be arranged between the individual braided layers. These fiber composite fabrics also consist, for example, of carbon, glass and/or aramid fibers and preferably have an orientation of 0°, 45° or 90°. The fiber composite fabrics have the effect that high compression forces can be better absorbed, and is therefore used as reinforcement.

As an alternative, the fiber composite component according to the invention may have a core element which consists of correspondingly tailored and stacked prepreg layers or dry semi-finished products and can be produced quasi manually. In this case, layers with 0°, 45°, or 90° orientations are preferred. Such a core element can be produced in a simple manner (for example, also in multi-component production) and has an extremely low weight.

In order to ensure an optimal absorption of the tensile forces by the fiber composite element surrounding the core element as well as the at least one passage opening or the at least one interior element in a loop-type manner, the braided fiber composite element is braided in a direction perpendicular to the longitudinal direction of the core element or, depending on the application, in a direction perpendicular to the transverse direction of the core element, preferably at braiding angles of ±85° with respect to these directions. Generally, a steep braiding angle, that is, a greater angle with respect to the braiding direction, is advantageous in order to be able to better absorb tensions in the braiding fibers. The braiding fibers then essentially have the orientation of the load and are optimally utilized. For the braiding, carbon, glass and/or aramid fibers are again preferably used, depending on the requirements, as required, here also, glass fiber and/or Grilon® supporting threads being applied.

For producing fiber composite components according to the invention, several core elements are required, each having at least one concavely constructed face, as well as at least one holding element, with the at least one concavely constructed face being adapted to the shape of the corresponding holding element. In a first step, several core elements are arranged in a stack such that, in each case, the at least one concavely constructed face is applied by resting against the corresponding holding element. This arrangement of stacked core elements and the at least one holding element is then fixed, as required, by means of spacers. In another step, the fixed arrangement is, for example, clamped into a circular braiding machine and a circular braiding takes place for forming a fiber composite element enclosing the core elements and the at least one holding element in a loop-type manner. Then the circularly braided arrangement is infiltrated and hardened. Subsequently, the at least one holding element is removed from the mold (if required, by means of chilling), and finally the circularly braided stacked core elements are separated from one another by means of cutting, sawing or milling in order to obtain separate fiber composite components which each have a core element.

In this manner, several fiber composite components can be produced simultaneously and can be separated from one another in the last processing step, by means of cutting, sawing or milling. This represents a particularly effective production method because other techniques, as a rule, allow only the production of a single component at a time.

According to a preferred method, the at least one holding element is covered with fiber composite material before the stacking of the core elements, so that, when stacked, the in each case at least one concavely constructed face rests against the fiber composite material of the corresponding holding element.

For this purpose, a braided fiber composite tube is preferably used, which is pulled over the at least one holding element in the manner of a stocking, before the stacking or placing of the core elements. This fiber composite tube can, in turn, be produced by means of the initially mentioned circular braiding technique by using carbon, glass and/or aramid fibers (as required, with corresponding supporting threads). However, the holding element can also be provided with the fiber composite material by the winding around or placing around of corresponding fibers or fabrics. In some cases, it is advantageous to compact (that is, condense, and/or harden) the fiber composite material after the application to the holding element.

To reduce weight, as mentioned above, the core element is formed by braiding individual layers around a foam core which is subsequently precompacted. The braiding around the foam core typically takes place in its longitudinal direction at braiding angles of ±45° by using carbon, glass and/or aramid fibers (and, as required, glass fiber and/or Grilon® supporting threads). In this case, fiber composite fabrics of carbon, glass and/or aramid fibers can be arranged between the individual braided layers, preferably with an orientation of 0°, 45°, or 90°.

In addition to the core elements produced as described above and consisting of circularly braided foam cores, additional core elements can be produced, where the foam core is surrounded by a separating foil before the circular braiding. This separating foil may, for example, be a Teflon® foil which is provided for facilitating a later separation of the individual fiber composite components. In the following, core elements with a separating foil surrounding the foam core will be called "loss cores".

The above-described core elements, including the so-called loss cores, can be produced as quasi continuous material and can subsequently be cut to the required measurement and precompacted. Then the at least one face is preferably machined by means of ultrasonic cutters. This technique results in better cut surfaces (for example, in comparison to blanking methods) since the foam core is locally compressed in the case of the latter. Because of the production of continuous material, the efficiency of the production process is increased more advantageously because a braiding around quasi several core elements takes place in one processing step.

The stack arrangement of the core elements can take place in different fashions. Either core elements whose foam cores are not surrounded by a separating foil are arranged alternately adjacent loss cores such that adjacent longitudinal sides of core elements and loss elements are each in contact with one another, or only core elements are used without the separating foil surrounding the foam core, in which case respective separating foils are then arranged between adjacent longitudinal sides of the core elements. The separating foil has the purpose of finally being able to better separate the individual fiber composite components which each contain a core element.

After the stacking or arranging of the core elements (or of the core elements and loss cores) by means of the at least one holding element, this arrangement is fixed, as required, by means of spacers in order to then braid around it, preferably by means of the circular braiding technique. For this purpose, the arrangement is disposed in a circular braiding machine such that the braiding takes place in the direction of the longitudinal axis of the at least one holding element. A steep braiding angle is advantageous in this case, so that the tensions can be better absorbed in the braiding fibers. Preferably a braiding angle of ±85° with respect to the braiding direction or longitudinal axis of the at least one holding element is used. Naturally other braiding angles can also be used. For the circular braiding, typically carbon, glass and/or aramid fibers can again be used. In this case the waviness of the braiding can be reduced in that additionally supporting threads are used consisting of glass and/or Grilon® fibers.

The thus circularly braided arrangement is then infiltrated typically by means of resin vacuum infiltration processes (for example, resin transfer molding or RTM, or vacuum assisted process or VAP) and is hardened. The hardening temperatures vary according to the used resin system. Typically, the hardening temperatures are in a range of from 100-200° C. Then the at least one holding element is removed, as required, by means of chilling.

Finally, the arrangement for separating the individual fiber composite components differs, depending on whether only core elements (without a separating foil surrounding the foam core) were used, or core elements and loss cores were arranged alternately in a stack. In the former case, the cutting, sawing or milling takes place along the separating foils arranged between the individual core elements. In the case of alternatingly stacked core elements and the loss core, the loss core is "sacrificed" in each case, because it is cut through in its longitudinal direction.

The fiber composite component according to the invention may be used, for example, as a joining element, compression-tension strut, rear link or transverse link in aerospace engineering (for example, in airplanes or helicopters) or in automotive engineering.

A particularly preferred application of the fiber composite component according to the invention is the bearing of landing flaps, particularly for the rear bearing of airplane landing flaps.

Other objects, advantages and novel features of the present invention will become apparent from the following detailed description of the invention when considered in conjunction with the accompanying drawings.

DETAILED DESCRIPTION OF THE DRAWINGS

In the figures, identical or similar components have identical reference numbers. The representations in the figures explain the fiber composite component purely schematically and may partly not be true to scale.

Figure 1A:
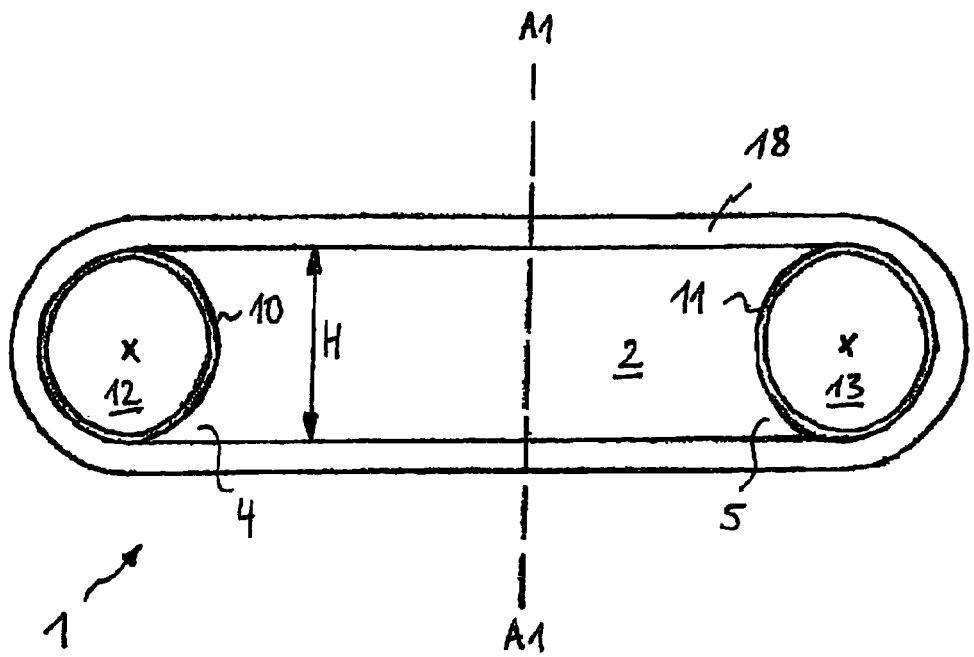
FIG. 1a is a schematic sectional view of a fiber composite component according to the invention.
Figure 1B:
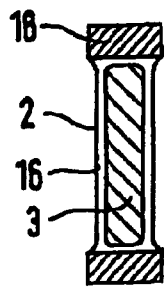
FIG. 1b is a cross-sectional view of the fiber composite component illustrated in FIG. 1a along Line A1-A1.
Figure 1C:
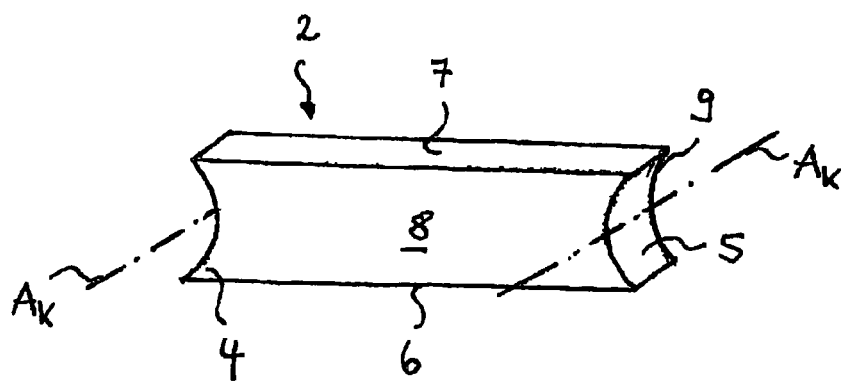
FIG. 1c is a schematic three-dimensional representation of a preferred core element.

FIG. 1a illustrates a preferred embodiment of the fiber composite component 1 according to the invention, which comprises a core element 2 whose faces 4, 5 are concavely constructed with a defined radius of curvature. This is also illustrated in FIG. 1c, which is a schematic three-dimensional representation of a rectangular parallelepiped shaped core element 2 with corresponding transverse sides 6, 7 and longitudinal sides 8, 9. The axis of curvature of the concavity $A_k$ extends perpendicular to the longitudinal sides 8, 9 and is illustrated in FIG. 1c by a dash-dotted line. Correspondingly, the axis of curvature of the concavity $A_k$ is perpendicular to the plane of the drawing of FIG. 1a, and is indicated by an "x".

As illustrated in FIG. 1a, ring-shaped interior elements 10 and 11 respectively adjoin the faces 4, 5 in each case in a shape-adapted manner. The term "shape-adapted" means that a continuous flush transition exists between the interior element 10, 11 and the concavely constructed face 4 and 5 respectively, which is achieved, for example, in that the radius of the concavity and the radius of the corresponding interior element correspond to one another. In this manner, a form-locking transition is achieved; that is, a transition without gaps, slots, cavities, etc. Naturally, the radius of interior element 10 may differ from that of interior element 11, but the radius of the face 4 will be adapted to the radius of the interior element 10 and the radius of the face 5 will be adapted to that of the interior element 11. In the case of the fiber composite component 1 illustrated in FIG. 1a, the radii of the faces 4, 5 are identical, and the outer circumference of the interior elements 10, 11 closes off flush with the transverse sides 6, 7 of the core element 2. That is, the outside diameter of the interior elements 10, 11 corresponds to the height H of the core element 2.

The ring-shaped interior elements 10, 11, by which the corresponding passage openings 12 and 13 respectively are formed, preferably consist of a braided tube section made of carbon, glass and/or aramid fibers, which will be described in greater detail hereinafter. As an alternative, the interior elements 10, 11 may also be produced from these fibers by means of a winding technique, or from prepreg materials or dry semi-finished products.

The core element 2 and the interior elements 10, 11 are surrounded by the braided fiber composite element 18, such that the side of the interior elements 10 and 11 respectively not surrounded by the respective concavely constructed face 4, 5 is enclosed by the braided fiber composite element 18. The fiber composite element 18 braided in the direction of the axis of curvature of the concavity $A_k$ in this case continuously rests against the transverse sides 6, 7 of the core element 2 and on the exterior circumferential surfaces of the interior elements 10, 11. Here also, the above-mentioned circular braiding technique can be used for the braiding of the fiber composite element 18, with reinforcing fibers made of carbon, glass and/or aramid fiber and, as required, supporting threads made of Grilon® and/or glass fibers.

The core element 2 consists of a foam core 3 (FIG. 1b) which is surrounded by a braiding such that its cross-section is essentially concentrically surrounded by individual braided layers 16. For this purpose, the braiding takes place around the foam core 3 in its longitudinal direction (that is, perpendicular to the plane of the drawing of FIG. 1b). The circular braiding can again be produced by means of the circular braiding technique by using carbon, glass and/or aramid fibers as reinforcing fibers and, as required, Grilon® and/or glass fibers as supporting fibers. Between the individual braided layers 16, fiber composite fabrics 17 can be arranged, which will be described in greater detail in the following in connection with FIGS. 3a and 3b.

As an alternative, a core element constructed of cut and stacked prepreg materials or dry semi-finished products can also be used.

Figure 2:
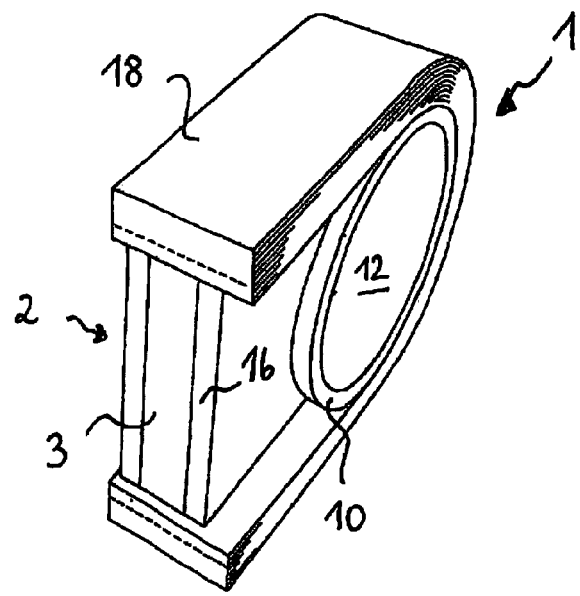
FIG. 2 is a cut three-dimensional view of a fiber composite component according to the invention.

FIG. 2 is a schematic three-dimensional cross-sectional view of a fiber composite loop 1, only the interior element 10 for forming the passage opening 12 being shown. The foam core 3 surrounded by braided layers as well as the braided fiber composite element 18 enclosing the core element 2 and the outer circumference of the interior element 10 are illustrated schematically. Because of the selected braiding concept, the core element 2 is used as a thrust piece, that is, for the absorption of compression forces, and the braided fiber composite element 18, which is also called a loop part, is conceived for the optimal absorption of tensile forces. Since the compression forces to be absorbed are low in contrast to the tensile forces, the core element 2 may be a sandwich structure (that is, a wrapped foam core), as described above, which achieves to a considerable saving of weight. For the absorption of tensile and compression forces, for example, bearings for the receiving of corresponding bolts can be introduced into the passage openings 12 and 13 respectively (not shown).

The fiber composite component according to the invention was illustrated above in a symmetrical embodiment; that is, passage openings 12, 13 (FIG. 1a) are provided on both sides for receiving corresponding bolts. Naturally, an asymmetrical arrangement (with, for example, only one passage opening) is also possible. The concave construction of the faces 4, 5 is of course not limited to the described curved shape. The recessed design of the faces can, for example, also have an angular (for example, triangular, rectangular, polygonal) shape. Furthermore, core elements which do not have a rectangular parallelepiped shape can also be used; that is, cubic-shaped, cylindrical, conical, pyramidal core elements or core elements of other shapes can also be used.

Figure 3A:
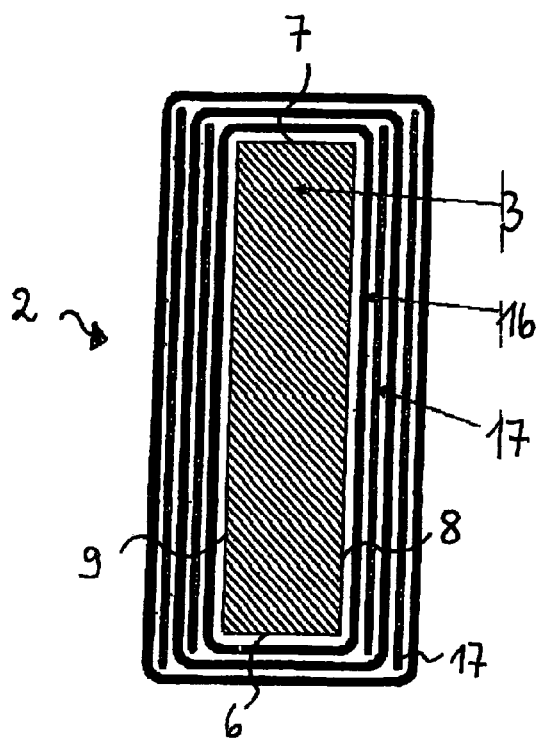
FIG. 3a is a cross-sectional view of a core element for explaining its production.

The method for producing fiber composite components according to the invention will now be described. For this purpose, FIG. 3a shows a core element 2 in a cross-sectional view. As in FIG. 1c, the transverse and longitudinal sides have the reference numbers 6, 7 and 8, 9. The rectangular parallelepiped shaped core element 2 consists of a foam core 3 (for example, PU foam) whose cross-section is essentially concentrically surrounded by the individual braided layers 16. The braided layers 16 are produced by braiding around the foam core 3 in its longitudinal direction, which extends perpendicular to the plane of the drawing of FIGS. 3a and 3b. The braided layers preferably are deposited at angles ±45°.

Carbon, glass and/or aramid fibers are preferably used as the braiding fibers. If the circular braiding method described in German Patent Document DE 102004017311 is used, additionally Grilon® and/or glass fibers can be used as supporting threads. During the braiding, in a first layer, for example, reinforcing fibers are braided at +45° and supporting threads are braided at −45°. The orientation of the braiding will then change in the next layer; that is, the reinforcing fibers are deposited at an angle of −45° and the supporting threads at an angle of +45°. If, for example, carbon fibers and Grilon® supporting threads are used, the fraction of carbon fibers in comparison to the Grilon® supporting threads is typically 98%.

Between the individual braided layers 16, a fiber composite fabrics 17 can be arranged as a reinforcement with preferably a 0°, 45°, or 90° orientation at the side walls, that is, along the longitudinal sides 8, 9, and, as required, may be fixed by means of a binder. The fiber composite fabric 17 again preferably consists of a unidirectional woven fabric made of carbon, glass and/or aramid fibers.

Figure 3B:
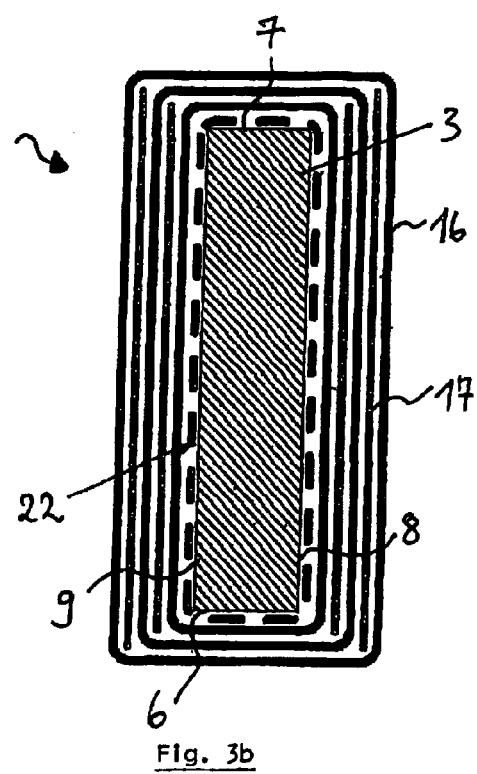
FIG. 3b is a cross-sectional view of a so-called loss core.

FIG. 3b illustrates another core element, a so-called loss core 21. The loss core 21 is produced completely analogously to the core element 2 illustrated in FIG. 3a. However, before the braiding around the foam core 3, the latter is surrounded by a separating foil 22, typically a Teflon® foil. The separating foil 22 is later used to achieve a better separation of the core elements or individual fiber composite components, as explained hereinafter in greater detail.

The core elements 2 and 21 respectively can advantageously be produced quasi as a continuous material, because long foam cores (that is, foam cores of a length of typically 1 m) are braided as described. After the braiding, the circularly braided foam core is precompacted (that is, evacuated at approximately 100° C.) and subsequently cut to size. The faces of the core elements are then changed to the desired radius or into the desired shape by means of an ultrasonic cutter. The machining by means of the ultrasonic cutter was found to be particularly advantageous because, in the case of other methods, for example, during the blanking, the foam core 3 is locally compressed, which has a negative influence on the component precision.

Figure 4:
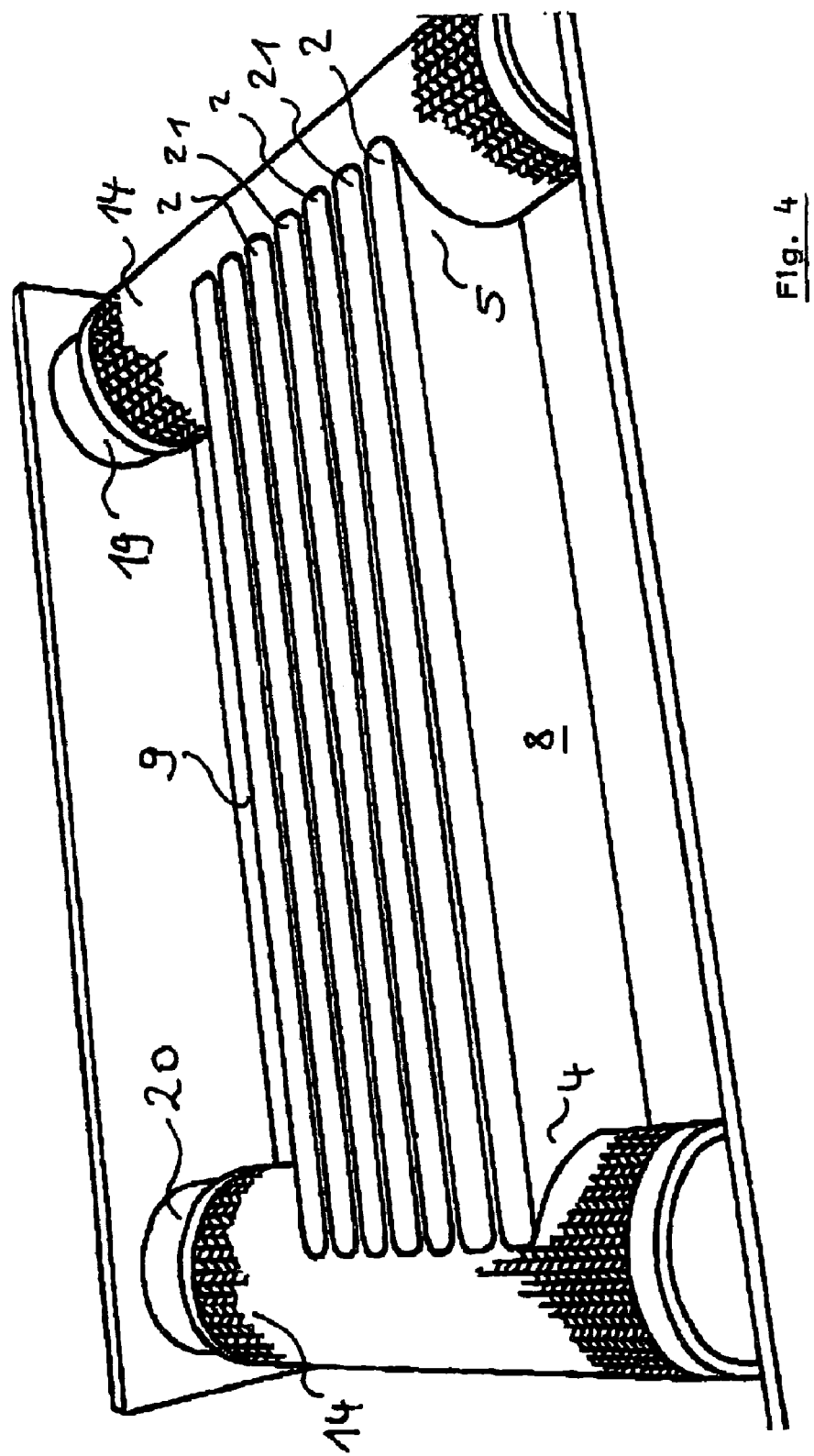
FIG. 4 is a perspective view for explaining the stacked arrangement of core elements along corresponding holding elements.

The prefabricated, that is, precompacted and cut core elements 2 and 21 respectively must be prepared for the final braiding operation. For this purpose, holding elements 19, 20 are used to arrange several such core elements in a stack shape (FIG. 4). The holding elements 19, 20 preferably have a tube-shaped or cylindrical construction and are made, for example of aluminum. The shape or the radius of the holding elements 19, 20 corresponds to the shape or the radius of the respective corresponding, concavely constructed face 5 and 4 respectively. (That is, the concavely constructed face 4 and the holding elements 20 are adapted to one another with respect to their shape.) Likewise, the concavely constructed face 5 is adapted with respect to the shape to the holding element 19. The diameters or the shape of the holding elements 19, 20 may of course also differ from one another. This naturally also causes different radii of curvature or shapes of the faces 5 and 4 respectively.

Before the stacked arrangement of the core elements, the holding elements 19, 20 are provided with a fiber composite material, preferably in the form of a sheathlike tube 14 consisting of carbon, glass and/or aramid fibers, which is tightly stretched over the holding elements 19, 20. As an alternative, such fibers may be wound around the holding elements 19, 20. However, prepreg materials or dry semi-finished products may also be placed around the holding elements 19, 20. In order to avoid a fold formation of the fiber composite fabric surrounding the holding elements 19, 20, pre-compacting in a vacuum as well as possibly prehardening is helpful.

As illustrated in FIG. 4, several core elements 2 and 21 respectively are arranged in the shape of a stack such that adjacent longitudinal sides 8, 9 of the core elements 2 and 21 contact one another and the respective faces 4, 5 simultaneously place themselves closely against the corresponding holding element 20 and 19 respectively. In FIG. 4, the concave lateral surfaces 4 of the core elements 2 and 21 respectively continuously rest against the sheath-like tube 14 pulled over the holding element 20, and the faces 5 correspondingly rest against the sheathlike tube 14 pulled over the holding element 14.

Figure 5:
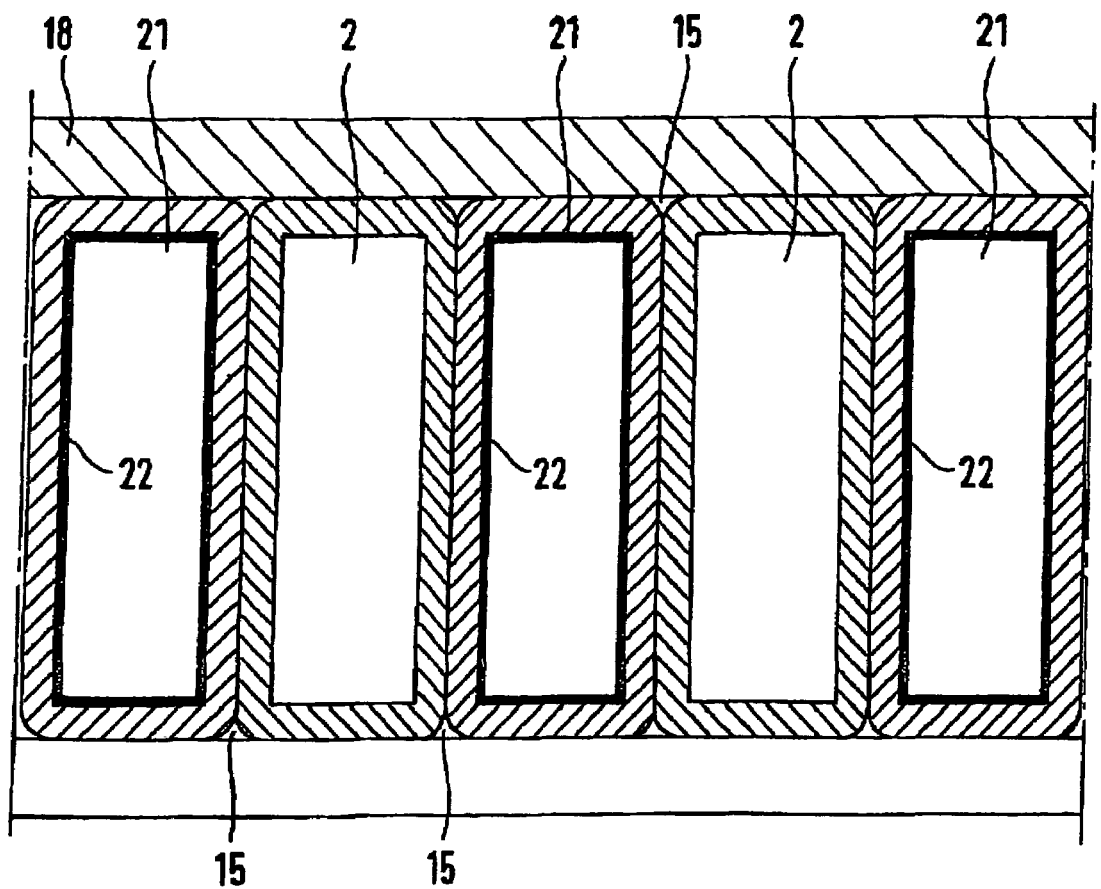
FIG. 5 is a schematic cross-sectional view of core elements arranged in a stack.

In the arrangement illustrated in FIG. 4, core elements 2 (that is, core elements without the separating foil 22 surrounding the foam core 3) are arranged alternately next to loss cores 21. The arrangement of the core elements 2, 21 as well as the holding elements 19, 20 is fixed, which is ensured, for example, by a corresponding frame or spacer. In order to ensure a termination that is as flush as possible with the fiber composite element 18 still to be braided on, corresponding crotches 15 can be arranged between the individual core elements 2 and 21 respectively in the area of the supporting surface on the holding elements 19 and 20 respectively, which is schematically illustrated in FIG. 5. Naturally, several core elements 2 (that is, core elements without the separating foil 22 surrounding the foam core 3, as described above) may also be arranged in a stack-shaped manner while being placed against the holding elements 19, 20. However, in this case, it will then be advantageous to provide corresponding separating foils 22, which extend along the longitudinal sides 8, 9 of the respective core elements 2 (not shown), between the individual core elements 2. This facilitates the later separation of the individual fiber composite components, which are described later in greater detail.

Figure 6:
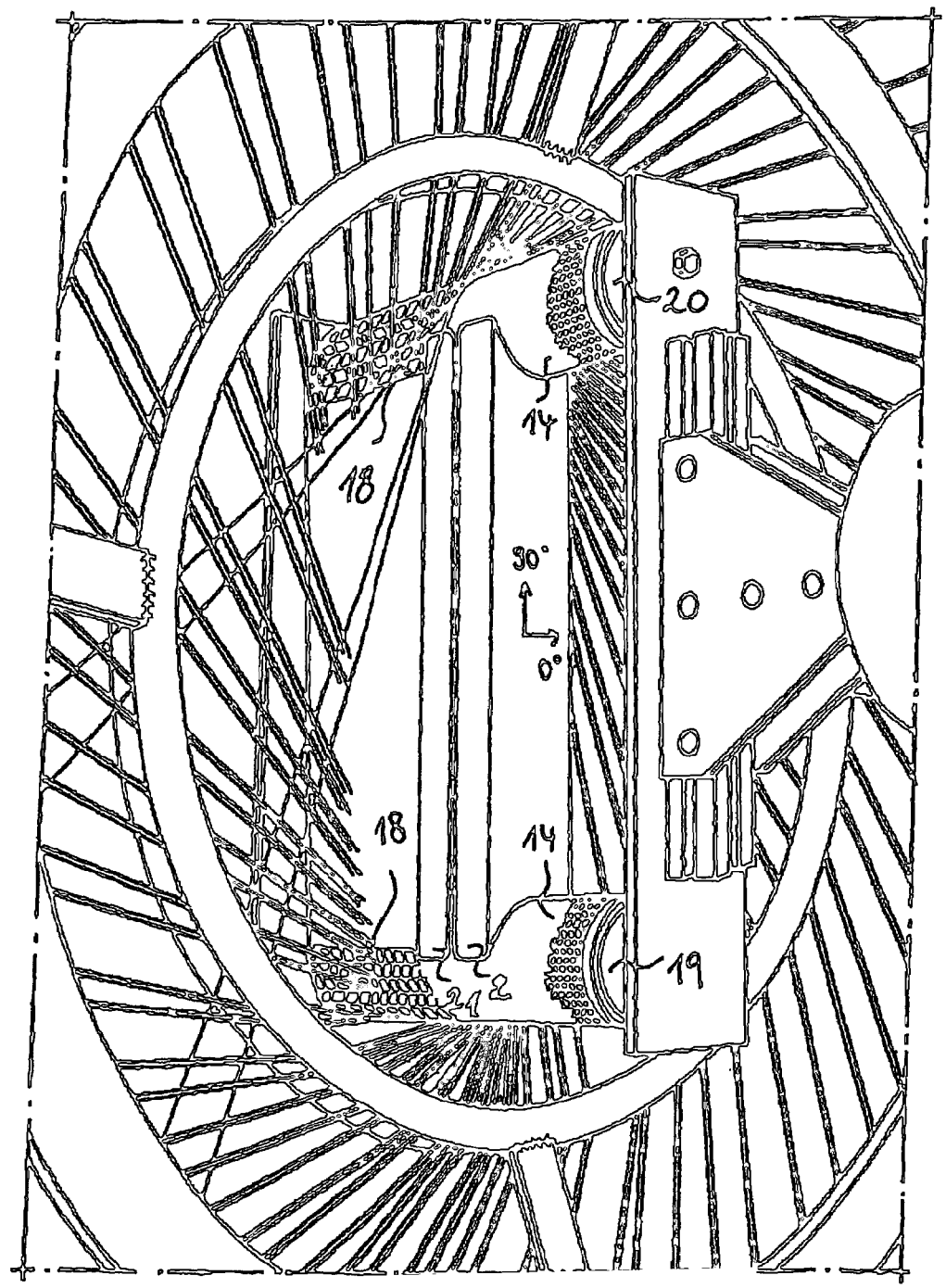
FIG. 6 is a view of an arrangement of stacked core elements and corresponding holding elements clamped into a circular braiding machine, for explaining the braiding around this arrangement.

The assembled and fixed arrangement of the core elements 2 and 21 respectively and the holding elements 19, 20 is subsequently clamped into a circular braiding machine in such a manner that the braiding direction coincides with the longitudinal dimension of the holding elements 19, 20 or with the axis of curvature of the concavity $A_k$, as illustrated in FIG. 6. The braiding again preferably takes place by means of carbon, glass and/or aramid fibers as reinforcing threads and, as required, Grilon® and/or glass fibers as supporting threads. Here it should be noted that a steep braiding angle is advantageous for the absorption of tensions in the fibers. The angle with respect to the braiding direction preferably amounts to ±85°, in FIG. 6, only braiding angles of 0° and 90° being indicated for the purpose of orientation. As in the case of the braiding around the foam cores 3, a unidirectional braiding is preferably produced. The total thickness of the terminating braided layer, that is, of the fiber composite element 18, typically amounts to 12 mm. By the described arrangement, 10 to 20 core elements can be braided around simultaneously.

Following the braiding process described in connection with FIG. 6, the circularly braided arrangement (also referred to as a braided body, semi-finished product or perform) is infiltrated and hardened. For hardening, typically a resin vacuum infiltration method (such as RTM or VAP) is used (which is known per se and therefore need not be described here in detail). The resin can be fed by way of two grooves in tube-shaped holding elements. After hardening, the holding elements are removed from the mold. In this case, it may be helpful to chill the entire arrangement because the holding elements contract more than the hardened braided body.

In a final step, the braided body, which was removed from the mold, is divided into individual fiber composite components 1 by means of cutting, sawing or milling. In this case, a wet circular saw was found to be particularly useful. If core elements 2 having no separating foil would around their foam core were used, the individual fiber composite components are separated by cutting 1 in the longitudinal direction, along two adjacent core elements 2. If core elements 2 were arranged alternately with the loss core 21 (in a stack shape in the step described in connection with FIG. 4), one loss core 21 respectively would be cut open in the center in its longitudinal direction. As a result, the loss cores 21 are sacrificed, and, because of the covering of the foam core 2 by the separating foil 22, the fiber composite components 1, which each have a core element 2, can easily be separated from one another. In a final step, the individual fiber composite components 1 can be cut to a desired end measure. The passage openings 12, 13 can also be milled to size, for example, for a bearing to be accommodated.

The above-explained invention has the advantage that the fiber composite components are designed corresponding to their tensile and compressive loading. The component absorbing the compression forces (that is, the core element) can be constructed as a sandwich structure of a low weight, and the loop-shaped braided fiber composite element is optimized for absorbing tension forces. Since the core elements can be prefabricated as a quasi continuous material and can be cut to size, a higher effectiveness is achieved because each core element does not have to be produced individually. The effectiveness can be further increased in that the braiding around several core elements takes place simultaneously and therefore several fiber composite elements can be produced simultaneously, which are finally separated from one another by a simple cutting, sawing or milling. As a result of the fiber composite construction, a high weight saving potential is obtained which here typically is at 40% in comparison to corresponding metallic structures.

Figure 7:
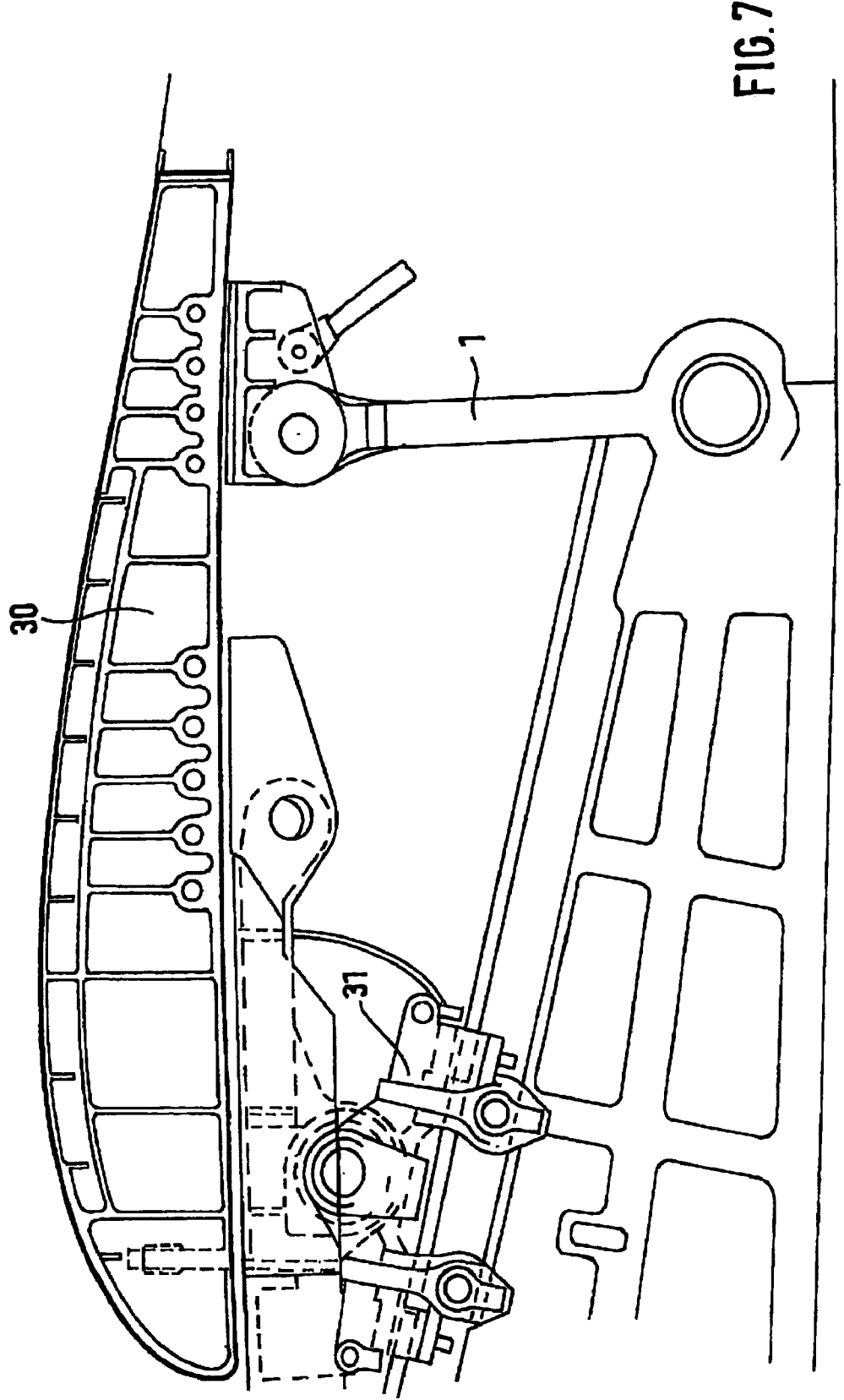
FIG. 7 is a schematic sectional view of a landing flap having a fiber component composite according to the invention in the form of a rear link.

FIG. 7 finally shows an example of an application in which the fiber composite component according to the invention is used as a rear link for the bearing of the exterior landing flap in an aircraft. The bearing of the landing flap 30 consists of a flap track carriage 31 which moves toward the rear on a track, and of a rear link 1 which is mounted on the track at the rear. By way of this bearing, all forces are transmitted to the wing.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST REFERENCE SYMBOLS

1 Fiber composite component
2 Core element or thrust piece
3 Foam core
4 Face of core element
5 Faces of core element
6 Transverse side of core element
7 Transverse side of core element
8 Longitudinal side of core element
9 Longitudinal side of core element
10 Interior element
11 Interior element
12 Passage opening
13 Passage opening
14 Fiber composite material or fiber composite tube
15 Crotch
16 Braided layer
17 Fiber composite woven
18 Fiber composite element or loop part
19 Holding element
20 Holding element
21 Core element or loss core
22 Separating foil
30 Landing flap
31 Carriage
$A_k$ Radius of curvature of concavity
H Height of core element

What is claimed is:

1. A figure composite component comprising:
a core element having at least one concave face;
a passage opening adjoining the at least one concave face of the core element; and
a braided fiber composite loop element which encloses respectively opposite transverse or longitudinal sides of the core element and the side of the passage opening that is not bounded by the core element.

2. The fiber composite component according to claim 1, wherein:
the concavely constructed face has a defined radius of curvature;
the passage opening has a substantially circular configuration; and
the braided fiber composite loop element surrounds the core element and the axis of curvature of the cavity.

3. The fiber composite according to claim 1, wherein:
an interior element for forming the passage opening in a shape-adapted manner adjoins the at least one concave face of the core element; and
the core element and an outer circumferential surface of the interior element are enclosed by the braided fiber composite element.

4. The figure composite component according to claim 3, wherein the interior element consists of a fiber composite material, particularly a braided fiber composite tube section.

5. The fiber composite component according to claim 2, wherein:
the core element has an essentially rectangular parallelepiped construction and corresponding transverse sides and longitudinal sides; and
the axis of curvature of the concavity extends perpendicular to the longitudinal sides.

6. The fiber composite component according to claim 5, wherein the fiber composite tube section consists essentially of carbon, glass and/or aramid fibers.

7. The fiber composite component according to claim 1, wherein the core element has a foam core around which a braiding is carried out which forms individual braided layers.

8. The fiber composite component according to claim 7, wherein the braided layers essentially concentrically enclose the cross-section of the foam core.

9. The fiber composite component according to claim 7, wherein the braiding around the foam core takes place at braiding angles of ±45°.

10. The fiber composite component according to claim 7, wherein fiber composite fabrics are arranged at least along the longitudinal sides of the core element between the individual braided layers.

11. The fiber composite component according to claim 7, wherein the braided layers consist essentially of carbon, glass and/or aramid fibers.

12. The fiber composite component according to claim 10, wherein the fiber composite fabric consists essentially of carbon, glass and/or aramid fibers.

13. The fiber composite component according to claim 1, wherein the core element consists of cut and stacked prepreg layers or dry semi-finished products.

14. The fiber composite component according to claim 2, wherein the fiber composite element is braided in a direction perpendicular to the transverse or longitudinal sides of the core element.

15. The fiber composite component according to claim 14, wherein the fiber component element consists essentially of carbon, glass and/or aramid fibers.

* * * * *